(12) United States Patent
Mehta

(10) Patent No.: US 7,376,657 B1
(45) Date of Patent: May 20, 2008

(54) FAST IPV6 ADDRESS LOOKUP USING SKIP LEVEL PROCESSING ON MULTI-BIT TRIES

(75) Inventor: Ashish K. Mehta, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 503 days.

(21) Appl. No.: 10/835,879

(22) Filed: Apr. 30, 2004

(51) Int. Cl.
*G06F 17/30* (2006.01)

(52) U.S. Cl. .................................... 707/100

(58) Field of Classification Search ............ 707/100, 707/204
See application file for complete search history.

(56) References Cited

U.S. PATENT DOCUMENTS

| | | | |
|---|---|---|---|
| 6,691,171 B1 * | 2/2004 | Liao | 709/245 |
| 7,099,881 B2 * | 8/2006 | Richardson et al. | 707/100 |
| 2004/0255045 A1 * | 12/2004 | Lim et al. | 709/245 |
| 2004/0264479 A1 * | 12/2004 | Raghunandan | 370/400 |

* cited by examiner

*Primary Examiner*—Cheryl Lewis
(74) *Attorney, Agent, or Firm*—Osha·Liang LLP

(57) ABSTRACT

A method for inserting a first prefix, including segmenting the first prefix into a first plurality of segments, indexing into a first trie node block using a first segment of the first plurality of segments to obtain a first trie node, obtaining a second segment of the first plurality of segments, determining whether the second segment of the first plurality of segments includes contiguous zeros, if the second segment includes contiguous zeros determining a number of contiguous zeros, determining a first skip level using the number of contiguous zeros, and inserting the first skip level into the first trie node.

20 Claims, 4 Drawing Sheets

FAST IPV6 ADDRESS LOOKUP USING SKIP LEVEL PROCESSING ON MULTI-BIT TRIES

BACKGROUND

In Internet communications, electronic packets of data are sent from an originating host to a receiving host by means of the Internet Protocol (IP). IP uses routers to transmit packets from hosts connected to one IP sub-network, or subnet, to hosts connected to different IP sub-networks. When an IP host (the source host) transmits a packet to another IP host (the destination), the source host consults a routing table to determine the IP address of the router that should be used to forward the packet to the destination host.

This IP address lookup is a major bottleneck in high performance routers. The current Internet Protocol, IPv6, specifies a 128-bit IP destination address. In IPv6, the 128-bit address is represented as a series of bytes separated by ":". Further, sets of contiguous zeros can be represented as "::". Address lookup would be simple if each 128-bit IP destination address could be looked up in a table that lists the output link for every assigned Internet address. In such a case, a hashing algorithm could be used for address lookup, but a router would have to keep millions or even billions of trie node blocks. To reduce database size, and the traffic needed to continually update the databases, a router database actually consists of a smaller set of address prefixes. This reduces router database size, but at the cost of requiring a more complex lookup scheme called longest matching prefix.

The longest matching prefix address lookup scheme requires the router to determine which of the prefixes in the router database has the longest exact match when compared to the destination address in the packet. For example, a router database may have the address prefixes P1=0101, P2=0101101, and P3=010110101011. If the first 12 bits of the destination address are 010110101101, the longest matching prefix is P2. But, if the first 12 bits of the destination address are 010110101011, the longest matching prefix is P3.

A number of trie-based techniques (i.e., techniques using trie node blocks to organize pre-fixes within the routing database) have been developed for conducting this longest matching prefix address lookup. The most commonly available address lookup implementation is a radix trie implementation. The radix trie implementation may require up to 128 memory accesses for an address lookup. Although, with binary branching, an implementation having 40,000 address prefixes may only require 16 memory accesses. An extension of the radix trie algorithm, dynamic prefix tries, may also require up to 128 memory accesses for address lookup. The Lulea scheme uses a three-level tree structure for the routing table. This scheme is essentially a three-level fixed-stride trie in which the trie nodes are compressed using a bitmap. Using this structure, a 32-bit address requires at most 12 memory accesses.

One of the more flexible and effective address lookup techniques is controlled prefix expansion. In this technique, tries of a predetermined height (e.g., 8-bits) (and hence with a predetermined number of memory accesses per lookup) are constructed for a prefix set. Dynamic programming algorithms are used to obtain space optimal fixed-stride and variable-stride tries of a given height.

SUMMARY

In general, in one aspect, the invention relates to a method for inserting a first prefix, comprising segmenting the first prefix into a first plurality of segments, indexing into a first trie node block using a first segment of the first plurality of segments to obtain a first trie node, obtaining a second segment of the first plurality of segments, determining whether the second segment of the first plurality of segments includes contiguous zeros, if the second segment includes contiguous zeros: determining a number of contiguous zeros, determining a first skip level using the number of contiguous zeros, inserting the first skip level into the first trie node, obtaining a third segment of the first plurality of segments, wherein the third segment does not contain contiguous zeros, setting a next pointer in the first trie node to point to a third trie node block, wherein the third trie node block corresponds to the third segment, indexing into the third trie node block using the third segment to obtain a third trie node, and storing the prefix in the third trie node, if the second segment does not include contiguous zeros: setting a next pointer in the first trie node to point to a second multi-level trie node, wherein the second trie node block corresponds to the second segment, indexing into the second trie node block using the second segment to obtain a second trie node, and storing the prefix in the second trie node.

In general, in one aspect, the invention relates to a router system for looking-up a prefix for a destination address, comprising a processor, a memory, a storage device, and software instructions stored in the memory for enabling the router under control of the processor, to: segment the destination address in to a plurality of segments, index into a first trie node block to obtain a first trie node using a first segment in the plurality of segments, follow a first pointer in the first trie node to a second trie node block, index into a second trie node block to obtain a first trie node using a second segment in the plurality of segments, follow a second pointer in the second trie node to a third trie node block if the second pointer is not NULL, if the second pointer is NULL: obtain the prefix stored in the second trie node, determine a net mask corresponding to the prefix, wherein determining the net mask comprises: using a level of the trie node block, and using a skip level, if the skip level is stored in the second trie node, apply the net mask to the destination address to obtain masked destination address, complete the look-up if the masked destination address matches the prefix, and backtrack if the masked destination address does not match the prefix.

Other aspects of the invention will be apparent from the following description and the appended claims.

DETAILED DESCRIPTION

Figure 1:
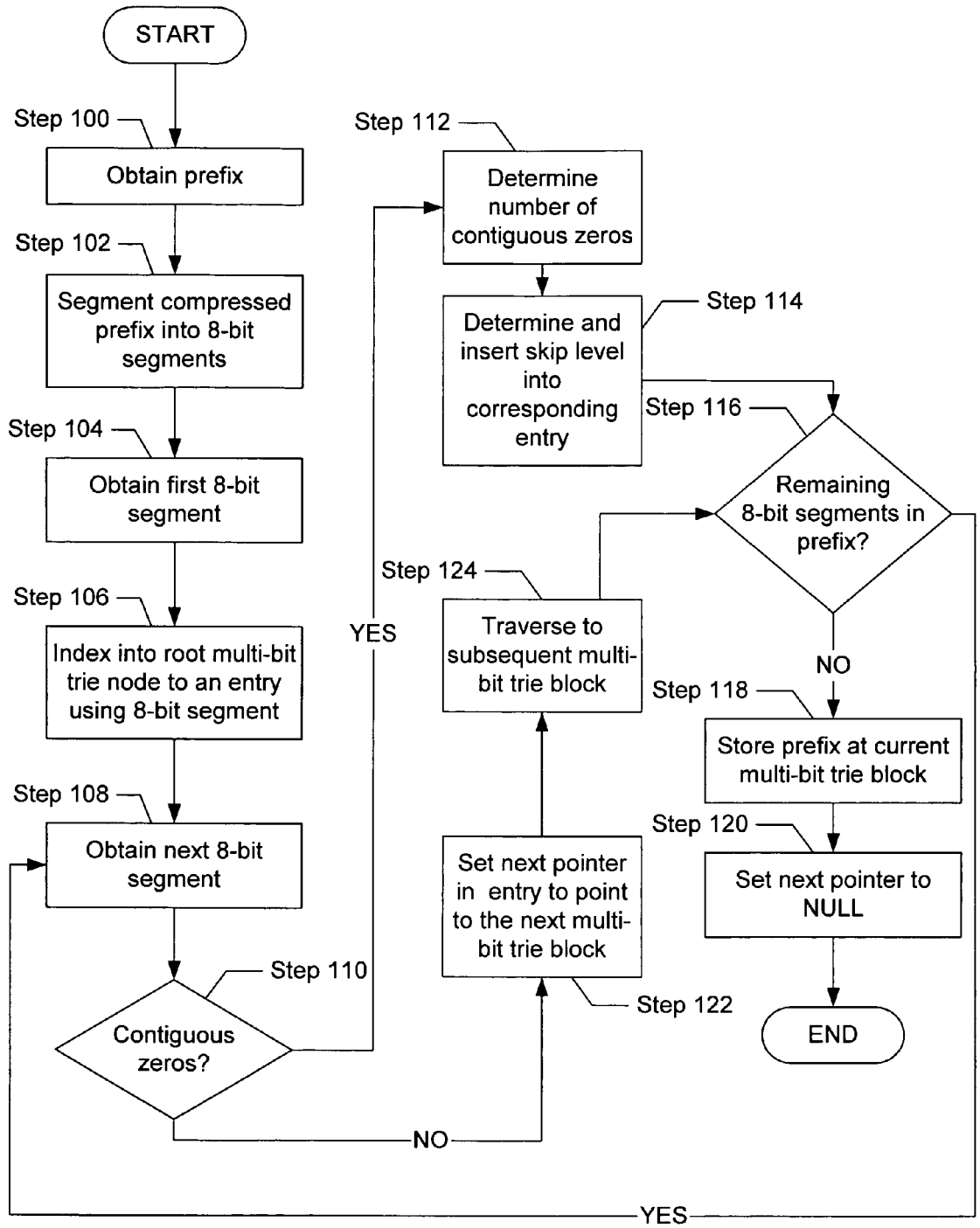
FIG. 1 shows a flow chart for inserting a prefix into a trie node block in accordance with one embodiment of the invention.

Exemplary embodiments of the invention will be described with reference to the accompanying drawings. Like items in the drawings are shown with the same reference numbers.

In one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, one or more embodiments of the invention relate to a method and apparatus for IP address lookup. More specifically, embodiments of the invention use trie node blocks to organize IP prefixes to allow for more efficient address look-up. Further, embodiments of the invention use skip level processing to more efficiently look-up IP prefixes within the trie node blocks. In one embodiment, the invention provides a method to efficiently store and look-up prefixes by compressing sets of contiguous zeros.

The following discussion details embodiments for inserting a prefix into a particular trie node block and for using the resulting trie node blocks to perform look-up of IP prefixes within the trie node blocks. In one embodiment of the invention, each trie node block corresponds to a table containing one or more trie node blocks, where the tables are, for example, located in a router database). Each trie node contains a next pointer, which may be used to point to another trie node block. The trie node blocks are organized in a hierarchy, where each level corresponds to a particular set of bits within a prefix. For example, assuming that each trie node block is an 8-bit node, then level 1 corresponds to bits 0-7 in the prefix, level 2 corresponds to bits 8-15 in the prefix, etc. The bits corresponding to a particular level are used to index into the particular trie node in a particular trie node block at that level. Those skilled in the art will appreciate that the 8-bit node is merely an example and that other size nodes may be used.

FIG. 1 shows a flow chart for inserting a prefix into a trie node block in accordance with one embodiment of the invention. Initially, a prefix is obtained (Step 100). The prefix is usually associated with a net mask (i.e., a bit mask that is applied to a destination address prior to determining whether there is match between the prefix and the destination address). The prefix is subsequently segmented into 8-bit portions (Step 102). Those skilled in the art will appreciate that prefix may be segmented into any $2^n$-bit size segments (where n is a whole number). In this particular case, the first 8-bit segment is subsequently obtained (Step 104), and used to index into a particular trie node (i.e., an trie node corresponding to the 8-bit segment) in the root trie node block (Step 106). If an trie node corresponding to the 8-bit segment does not exist, then an trie node is created (not shown). The next 8-bit segment in the prefix is subsequently obtained (Step 108).

A determination is then made whether the 8-bit segment contains contiguous zeros (Step 110). In one embodiment of the invention, a set of zeros is said to be contiguous if there are at least 2 contiguous zeros. As used herein, in order to be contiguous, at least 2 zeros must be in the same segment (i.e., the zeros in E0:0F are not considered, while the first pair of zeros in 00:F0, and both pairs of zeros in 00:00 are considered contiguous). Once it is determined that there are contiguous zeros, then the number of contiguous zeros is determined (Step 112). Note that the determination of the number of contiguous zeros may include obtaining one or more additional 8-bit segments until a segment containing non-zero bit is encountered. After the number of contiguous zeros is determined, the number of contiguous zeros is used to determine the corresponding skip level(s) to insert into the current trie node (Step 114). Specifically, the number of contiguous zeros is divided by the number of bits in the trie node block (e.g., if the trie node block is an 8-bit trie node then the number of number of bits is 8). The result of the aforementioned calculation provides the number of skip levels. The number of skip levels is subsequently recorded in the corresponding trie node.

In one embodiment of the invention, each trie node within a given trie node block may include a corresponding skip level. Once the skip level has been inserted into the trie node, a determination is then made whether there are any remaining 8-bit segments in the prefix to be processed (Step 116). If there are no additional 8-bit segments in the prefix to process, then the prefix is stored at the current trie node within the trie node block (Step 118) and the next pointer within the trie node is set to NULL (Step 120). Alternatively, if there are additional 8-bit segments to process, then Steps 108-124 are repeated.

Returning to Step 110, if there are no contiguous zeros, then the next pointer in the trie node is set to point to the trie node block referenced by the next 8-bit segment (obtained in Step 108) (Step 122). The next pointer is subsequently followed to the trie node block (Step 124). A determination is then made whether there are any 8-bit segments remaining to be processed (Step 116). If there are no more 8-bit segments remaining to be processed, then Steps 118-120 are performed. Alternatively, if there are additional 8-bit segments to process, then Steps 108-124 are repeated. Though not shown in FIG. 1, the each trie node has a pointer (i.e., a back pointer) to the trie node from which it originated in the parent trie node block.

Figure 2:
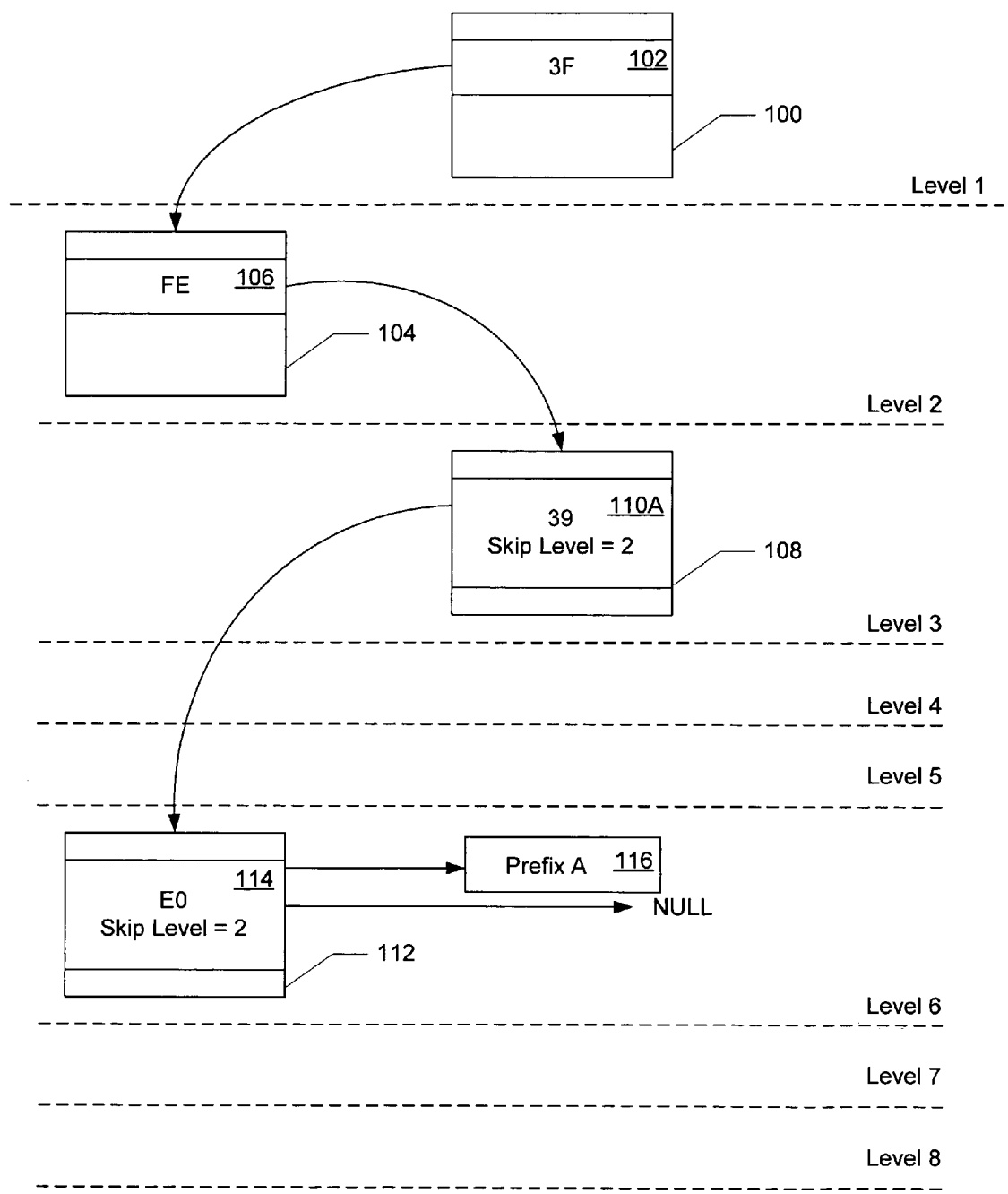
FIG. 2 shows trie node blocks in accordance with one embodiment of the invention.

After the aforementioned process is performed, the prefix will be inserted into a particular trie node in the multi-bit node. FIG. 2 shows trie node blocks in accordance with one embodiment of the invention. More specifically, FIG. 2 shows the result of inserting a prefix into a trie node block using the process described in FIG. 1. In the particular example shown in FIG. 2, each trie node block is an 8-bit trie node. Further, the prefix to be inserted into the trie node block is 3FFE:3900:00E0:0000/64. The prefix may be segmented into the following 8-bit portions: 3F FE, 39, 00, 00, E0, 00, 00. Initially, the first 8-bit segment is obtained (i.e., 3F) and used to index into a particular trie node (i.e., 102) of the root trie node block (100) (i.e., the trie node block in level 1). The next 8-bit segment is then obtained (i.e., FE). Since the next 8-bit segment is not a set of contiguous zeros, then the next pointer in the current trie node (i.e., 102) is set to point to the corresponding trie node block in level 2 (i.e., 104).

Once the next pointer has been followed to the corresponding trie node block in level 2 (i.e., 104), the 8-bit segment (i.e., FE) is used to index into the corresponding trie node (106) in the trie node block (104). The next 8-bit segment is then obtained (i.e., 39). Since the next 8-bit segment is not a set of contiguous zeros, then the next pointer in the current trie node (i.e., 106) is set to point to the corresponding trie node block in level 3 (108). Once the next pointer has been followed to the corresponding trie node block in level 3 (i.e., 108), the 8-bit segment (i.e., 39) is used to index into the corresponding trie node (110A) in the trie node block (108). The next 8-bit segment is then obtained (i.e., 00). Because the next 8-bit segment includes contiguous zeros, the number of contiguous zeros (including zeros in the current 8-bit segment being processed as well as subsequent 8-bit segments) is determined. In this particular example there are 4 contiguous zeros in hexadecimal notation, or 16 zeros in binary notation. The number of zeros (i.e., 16) is then divided by the number of bits per trie node block (i.e., 8) to obtain the number of skip levels (i.e., 2). The skip level is subsequently stored in the corresponding trie node (i.e., 110A) within the trie node block (108). The next 8-bit segment is then obtained (i.e., E0). Then, the next pointer in the current trie node (i.e., 110A) is set to point to correspond trie node block in level 6 (i.e., 112).

Once the next pointer has been followed to the corresponding trie node block in level 6 (i.e., 112), the 8-bit segment (i.e., E0) is used to index into the corresponding trie node (114) in the trie node block (112). The next 8-bit segment is then obtained (i.e., 00). Because the next 8-bit segment includes contiguous zeros, the number of contiguous zeros is determined. In this particular example there are 4 contiguous zeros in hexadecimal notation, or 16 zeros in binary notation. The number of zeros (i.e., 16) is then divided by the number of bits per trie node block (i.e., 8) to obtain the number of skip levels (i.e., 2). The skip level is subsequently stored in the corresponding trie node (i.e., 114) within the trie node block (i.e., 112). Because there are no more 8-bit segments remaining to be processed, the next pointer at the current trie node (i.e., 114) is set to NULL. In addition, the prefix (i.e., Prefix A (116)) is associated with the current trie node (i.e., 114). At this stage, prefix 3FFE:3900:00E0:0000/64 has been successfully inserted into a trie node block.

Those skilled in the art will appreciate that the values of the 8-bit segments within a prefix define a unique path. Thus, if the process defined in FIG. 1 is to be used successfully for all prefixes, then care must be taken to ensure that the unique path for each prefix entered into a trie node block is maintained. Specifically, consider the scenario where a first prefix: 3FFE:3900:00E0:0000/64 (emphasis added) is inserted into a trie node block. In this case, the bolded zeros are suppressed using skip levels (refer to FIG. 2). If a subsequent prefix containing a common portion is subsequently inserted into the trie node blocks, then one or more of the suppressed skip levels may need to be unsuppressed to maintain the unique path. For example, if the following prefix (hereinafter referred to as the second prefix) 3FFE:3900:77 E0:0000/64 is to be inserted into the multi-bit trie, then one pair of the suppressed zeros in the first prefix (i.e., 3FFE:3900:00E0:0000/64) (emphasis added) must be unsuppressed, and a corresponding trie node block added, in order to preserve the unique path.

Figure 3:
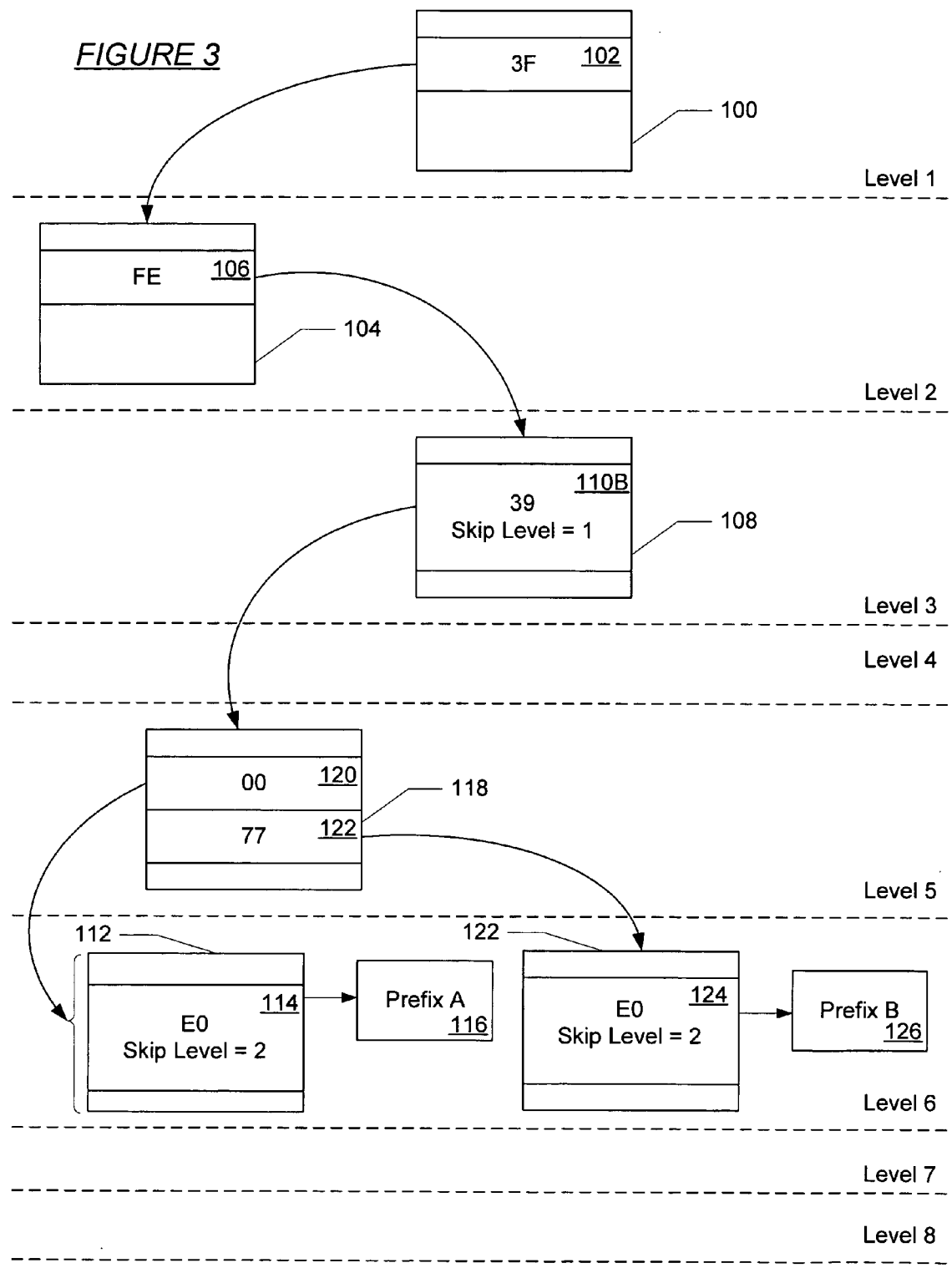
FIG. 3 shows trie node blocks in accordance with one embodiment of the invention.

FIG. 3 shows trie node blocks in accordance with one embodiment of the invention. More specifically, FIG. 3 shows the result of inserting a second prefix into a trie node block in which a suppressed set of zeros are unsuppressed. In the particular example, shown in FIG. 3, each trie node block is an 8-bit trie node. Note that prefix 3FFE:3900:00E0:0000/64 was already added, as shown in FIG. 2. The prefix to be inserted into the trie node block is 3FFE:3900:77 E0:0000/64. The prefix may be segmented into the following 8-bit portions: 3F, FE, 39, 00, 77, E0, 00, 00. Initially, the first 8-bit segment is obtained (i.e., 3F) and used to index into a particular trie node (102) in the root trie node block (100) (i.e., the trie node block in level 1). The next 8-bit segment is then obtained (i.e., FE). Since the next 8-bit segment is not a set of contiguous zeros, then the next pointer in the current trie node (i.e., 102) is set to point to correspond trie node block in level 2 (104).

Once the next pointer has been followed to the corresponding trie node block in level 2 (i.e., 104), the 8-bit segment (i.e., FE) is used to index into the corresponding trie node (106) in the trie node block (104). The next 8-bit segment is then obtained (i.e., 39). Since the next 8-bit segment is not a set of contiguous zeros, the next pointer in the current trie node (i.e., 106) is set to point to corresponding trie node block in level 3 (108). Once the next pointer has been followed to the corresponding trie node block in level 3 (i.e., 108), the 8-bit segment (i.e., 39) is used to index into the corresponding trie node (110B) in the trie node block (108). Up to this point, no suppressed zeros need to be unsuppressed and no additional trie node blocks have been added.

The next 8-bit segment (i.e., 00) is then obtained. Because the next 8-bit segment includes contiguous zeros, the number of contiguous zeros is calculated. In this particular example there are 2 contiguous zeros in hexadecimal notation, or 8 zeros in binary notation. The number of zeros (i.e., 8) is then divided by the number of bits per trie node block (i.e., 8) to obtain the number of skip levels (i.e., 1). The skip level is subsequently stored in the corresponding trie node (i.e., 110B) within the trie node block (i.e., 108). Because the skip level in the trie node (i.e., 110B) prior to inserting prefix 3FFE:3900:77 E0:0000/64 was 2 and is now 1, an additional trie node block must be added at level 5.

The new trie node block (118) is then inserted into level 5. The trie node block (118) includes one trie node corresponding to "00" (in hexadecimal notation) (120) and a second trie node corresponding to "77" (in hexadecimal notation). The trie node "00" (120) corresponds to one pair of zeros that were previously suppressed (refer to FIG. 2). The next pointer from trie node (110B), which previously pointed to trie node block (112), is updated to point to trie node block (118). Further, the next pointer in trie node (120) in trie node block (118) is set to point to trie node block (112). Note the contents of trie node block (112) were determined previously, as described in FIG. 2. In addition, the next pointer in trie node (122) in trie node block (118) is set to point to trie node block (122).

The next 8-bit segment is then obtained (i.e., 00). Because the next 8-bit segment includes contiguous zeros, the number of contiguous zeros is calculated. In this particular example there are 4 contiguous zeros in hexadecimal notation, or 16 zeros in binary notation. The number of zeros (i.e., 16) is then divided by the number of bits per trie node block (i.e., 8) to obtain the number of skip levels (i.e., 2). The skip level is subsequently stored in the corresponding trie node (i.e., 124) within the trie node block (i.e., 122). Because there are no more 8-bit segments remaining to be processed, the next pointer at the current trie node (i.e., 124) is set to NULL (not shown). In addition, the prefix (i.e., Prefix B (126)) is associated with the current trie node (i.e., 124). At this stage, prefix 3FFE:3900:77 E0:0000/64 has been successfully inserted into a trie node block. The aforementioned method of unsuppressing the previously suppressed zeros on a per-trie node block basis may be referred to as determining the "Lowest Common Compression" for each trie node in each trie node block.

Figure 4:
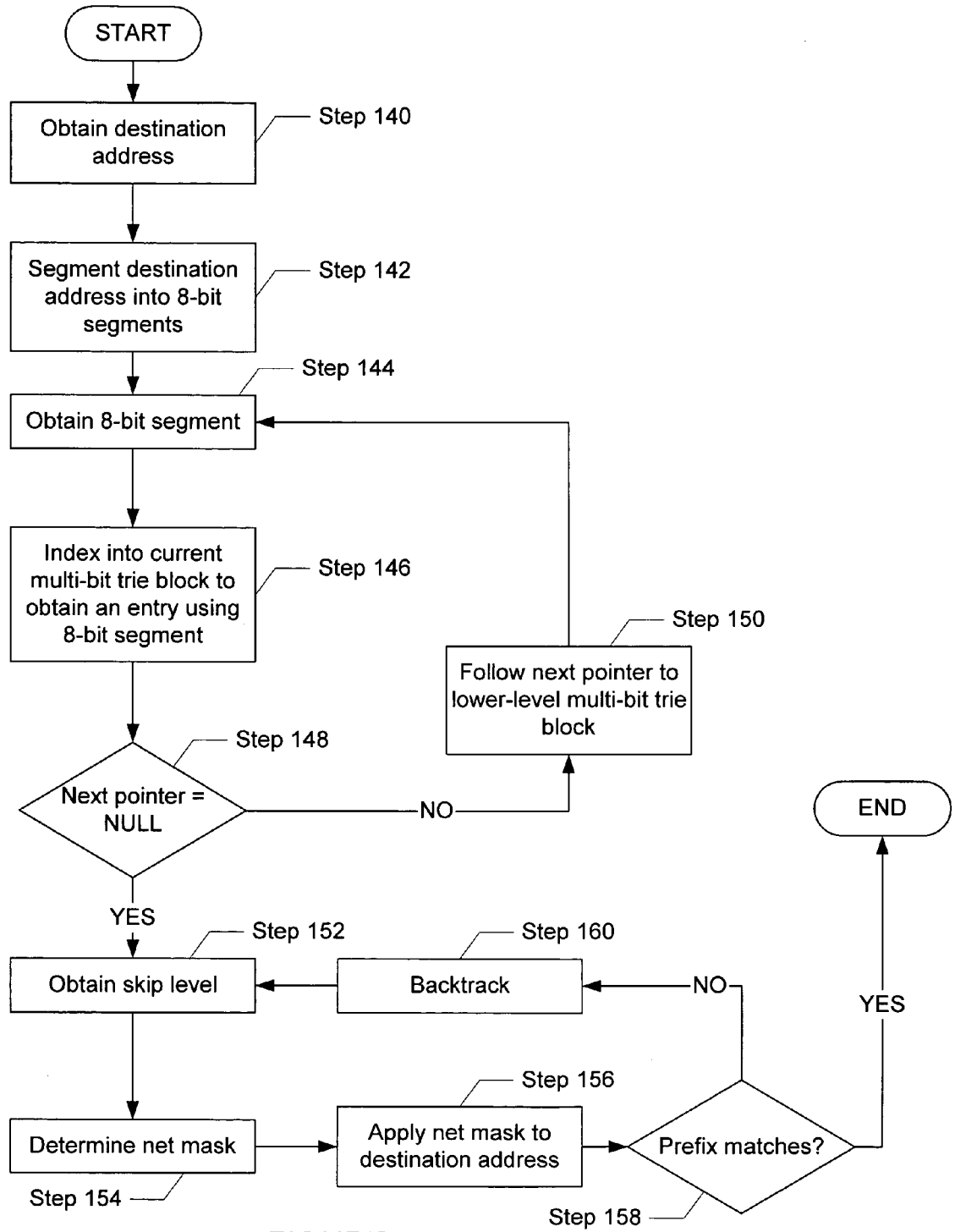
FIG. 4 shows a flow chart describing a method of using trie node blocks in accordance with one embodiment of the invention.

FIG. 4 shows a flow chart describing a method of using trie node blocks in accordance with one embodiment of the invention. Initially, a destination address is obtained (Step 140). In one embodiment of the invention, the destination address is a 128-bit IPv6 address. The destination address is subsequently segmented into 8-bit segments (142). The first 8-bit segment is subsequently obtained (step 144). The 8-bit segment is then used to index into an trie node within the root trie node block (Step 146). If the next pointer in the trie node is not NULL (Step 148), then the next pointer in the trie node is followed to the corresponding trie node block (Step 150). Steps 144-150 are repeated until an trie node having next pointer equal to NULL is encountered (Step 148).

When an trie node having a next pointer equal to NULL is encountered, the skip level and prefix associated with the trie node are obtained (Step 152). The net mask for the prefix is then determined using the skip level stored within the trie node and the level of the trie node block in which the trie node resides (Step 154). For example, consider trie node (114) in trie node block (112) in FIG. 2. The trie node (114) includes a skip level of 2 and is located in a trie node block at level 6. Assuming that each trie node block is 8-bits, then the net mask is equal to 6*8+2*8=64 bits.

Continuing with the discussion of FIG. 4, the net mask is subsequently applied to the destination address to obtain a masked destination address (Step 156). The masked destination address is then compared to the prefix stored in the trie node (Step 158). If there is a match between the prefix and the masked destination address, then the address look-up is complete. Alternatively, if there is not a match, then backtracking occurs (Step 160). In one embodiment of the invention, backtracking corresponds to moving to a previous trie node in the same trie node block. If the beginning of the trie node block is encountered (while backtracking) and a match has not been found, then the back pointer (not shown) in the trie node block is followed to the previous trie node block (i.e., a trie node block one or more levels above the current level). The same steps, with respect to backtracking are repeated in this trie node block. Steps 152 to 160 are preformed for each trie node encountered during backtracking.

The following example is used to illustrate backtracking. Assume that the trie node blocks in FIG. 3 have been traversed and trie node (124) in trie node block (122) has been encountered. Further, assume that prefix B (126) does not match the destination address (after the net mask has been applied). In this scenario, backtracking will result in performing steps 152-160 on trie node blocks preceding trie node (124). If no matching prefix is found, then backtracking will result in a traversal up the trie node block hierarchy to trie node block (118). Steps 124-160 will then be performed for each trie node in trie node block (118) starting from where the search for the prefix initially branched off in the parent trie node block. Thus, continuing with the scenario discussed above, if matching prefix is not found in trie node block (124), then a back pointer from a trie node (not shown) in trie node block (124) is traversed back to trie node (122) in trie node block (118). Steps 152-160 are then repeated starting at trie node (122). This process is repeated until either a matching prefix is found or all the trie node blocks in the backtrack path (i.e., a subset of all trie nodes in trie node blocks (100, 104, 108, and 118)) have been analyzed and no matching prefix has been found.

Those skilled in the art will appreciate that while the above description discusses inserting a prefix into a particular trie node block, the invention may be extended to deleting a prefix from a trie node block. Further, those skilled in the art will appreciate, that deleting a given prefix from a trie node block may result in suppression of additional contiguous zeros and, as a result, removal of one or more trie node blocks.

In one embodiment of the invention, each trie node block corresponds to a hash table. Alternatively, each trie node block corresponds to an array indexed by 8-bit segments. In one embodiment of the invention, the representation of the trie node blocks and functionality to insert, delete and look-up prefixes is included within a single router. More specifically, in one embodiment of the invention, the router may include a memory and a disk to store the trie node blocks as well as software that includes functionality to insert, delete and look-up prefixes within the trie node blocks. Further, the router may include a processor that is configured to execute the software instructions. In addition, the router may include one or more network interfaces to connect to the Internet, a local area network, and/or a computer.

Embodiments of the invention provide a method for efficiently performing prefix look-ups for IPv6 destination addresses. Further, embodiments of the invention provide a method for reducing the number of trie node blocks and trie node blocks that are required to store a given prefix, thereby decreasing the amount of storage required to maintain the trie node blocks. In addition, embodiments of the invention allow for more efficient prefix look-up by decreasing the number of trie node blocks that are traversed to find a matching prefix.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for inserting a first prefix into a router database, comprising:
segmenting the first prefix into a first plurality of segments;
indexing into a first trie node block using a first segment of the first plurality of segments to obtain a first trie node;
obtaining a second segment of the first plurality of segments, wherein the second segment of the first plurality of segments includes contiguous zeros;
determining a number of contiguous zeros;
determining a first skip level using the number of contiguous zeros;
inserting the first skip level into the first trie node;
obtaining a third segment of the first plurality of segments, wherein the third segment does not contain contiguous zeros;
setting a next pointer in the first trie node to point to a second trie node block, wherein the second trie node block corresponds to the third segment; and
indexing into the second trie node block using the third segment to obtain a second trie node
storing the first prefix in the second trie node,
wherein the first prefix is used to route a packet to a destination host.

2. The method of claim 1, further comprising:
setting a next pointer in the second trie node to NULL.

3. The method of claim 1, wherein each of the first plurality of segments is an 8-bit segment.

4. The method of claim 1, further comprising:
obtaining a second prefix;
segmenting the second prefix into a second plurality of segments;
indexing into the first trie node block using a first segment of the second plurality of segments to obtain a first trie node;
obtaining a second segment of the second plurality of segments;

determining a second skip level, beginning at the second segment of the second plurality of segments, associated with the second plurality of segments;
determining whether the second segment of the second plurality of segments matches the second segment of the first plurality of segments;
if the second segment of the second plurality of segments matches the second segment of the first plurality of segments:
determining whether the second skip level is equal to the first skip level;
selecting the lower skip level between the first skip level and the second skip level to obtain a selected skip level, if the second skip level is not equal to the first skip level;
storing the selected skip level in the first trie node, if the second skip level is lower than the first skip level;
inserting a third trie node block in response to storing the selected skip level, if the second skip level is lower than the first skip level;
obtaining a third segment of the second plurality of segments, wherein the third segment does not contain contiguous zeros;
setting a next pointer in the first trie node to point to the third trie node block, wherein the third trie node block corresponds to the third segment of the second plurality of segments;
indexing into the third trie node block using the third segment to obtain a third trie node; and
storing the second prefix in the third trie node.

5. The method of claim 1, wherein the first trie node block is an n-bit trie node.

6. The method of claim 5, wherein determining the skip level comprises dividing the number of contiguous zeros in the first prefix by n-bits.

7. The method of claim 1, wherein the first trie node block is referenced by at least one next pointer.

8. The method of claim 1, wherein the first prefix correspond to an IPv6 prefix.

9. A method for looking-up a prefix for a destination address in a router database, comprising:
segmenting the destination address in to a plurality of segments;
indexing into a first trie node block to obtain a first trie node using a first segment in the plurality of segments;
traversing to a second trie node block using the first pointer in the first trie node;
indexing into the second trie node block to obtain a first trie node of the second trie node block using a second segment in the plurality of segments;
obtaining a second pointer from the first trie node, wherein the second pointer is NULL;
obtaining the prefix stored in the second trie node;
determining a first net mask corresponding to the prefix, wherein determining the first net mask comprises:
using a level of the trie node block, and
using a skip level, if the skip level is stored in the second trie node;
applying the first net mask to the destination address to obtain a first masked destination address;
completing the look-up if the first masked destination address matches the prefix,
sending a packet toward the destination address using a result of the look-up.

10. The method of claim 9, further comprising:
backtracking if the masked destination address does not match the prefix.

11. The method of claim 10, wherein backtracking comprises:
determining whether there is a third trie node in the second trie node block that precedes the second trie node;
traversing to the third trie node if the third trie node precedes the second trie node;
traversing to a fourth trie node in the first trie node block if the third trie node is not present in the second trie node block.

12. The method of claim 11, further comprising:
after traversing to the third trie node:
obtaining the prefix stored in the third trie node;
determining a second net mask corresponding to the prefix, wherein determining the second net mask comprises:
using a level of the trie node block, and
using a skip level, if the skip level is stored in the second trie node;
applying the second net mask to the destination address to obtain a second masked destination address;
completing the look-up if the second masked destination address matches the prefix; and
backtracking if the second masked destination address does not match the prefix.

13. The method of claim 9, wherein each of the plurality of segments is an 8-bit segment.

14. The method of claim 9, wherein the destination address is an IPv6 address.

15. The method of claim 9, wherein the first trie node block is a hash table.

16. A router system for looking-up a prefix for a destination address in a router database, comprising:
a processor;
a memory;
a storage device; and
software instructions stored in the memory for enabling the router under control of the processor, to:
segment the destination address in to a plurality of segments;
index into a first trie node block to obtain a first trie node using a first segment in the plurality of segments;
follow a first pointer in the first trie node to a second trie node block;
index into a second trie node block to obtain a first trie node using a second segment in the plurality of segments;
obtaining a second pointer from the first trie node, wherein the second pointer is NULL;
obtain the prefix stored in the second trie node;
determine a first net mask corresponding to the prefix, wherein determining the first net mask comprises:
using a level of the trie node block, and
using a skip level, if the skip level is stored in the second trie node;
apply the first net mask to the destination address to obtain a first masked destination address;
complete the look-up if the first masked destination address matches the prefix; and
backtrack if the first masked destination address does not match the prefix.

17. The router of claim 16, wherein software instructions to backtrack comprise instructions to:
determine whether there is a third trie node in the second trie node block that precedes the second trie node;
traverse to the third trie node if the third trie node precedes the second trie node;

traverse to a fourth trie node in the first trie node block if the third trie node is not present in the second trie node block.

18. The router of claim 17, further comprising instructions to:
after traversing to the third trie node:
obtain the prefix stored in the third trie node;
determine a second net mask corresponding to the prefix, wherein determining the second net mask comprises:
using a level of the trie node block, and
using a skip level, if the skip level is stored in the second trie node;
apply the second net mask to the destination address to obtain a second masked destination address;
complete the look-up if the second masked destination address matches the prefix; and
backtrack if the second masked destination address does not match the prefix.

19. The router of claim 16, wherein the destination address is an IPv6 address.

20. The method of claim 16, wherein the first trie node block is a hash table.

* * * * *